Feb. 18, 1930.                H. N. BERRY                1,747,567
                              COTTON PICKER
                       Original Filed April 23, 1927
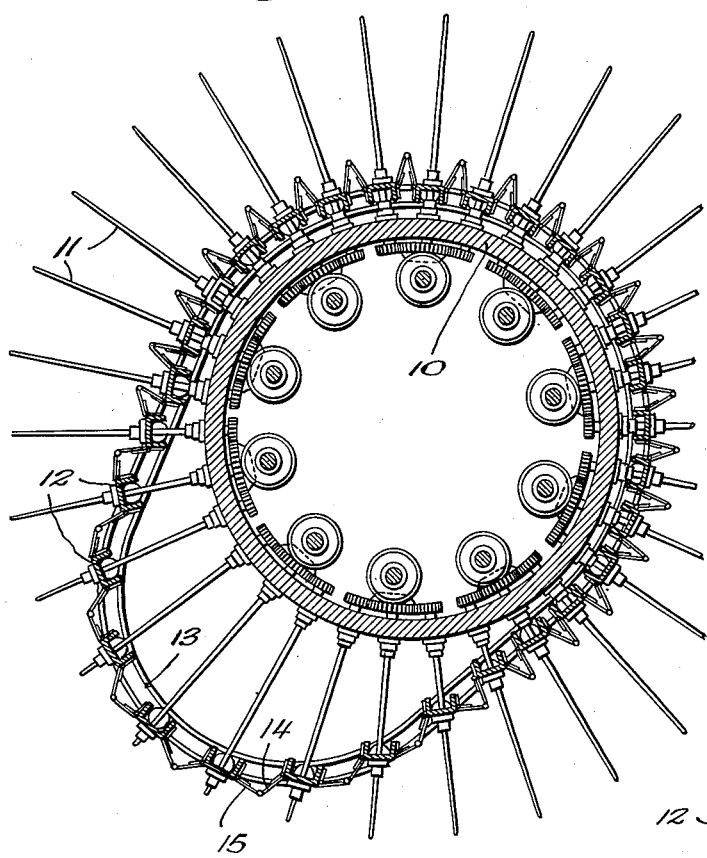
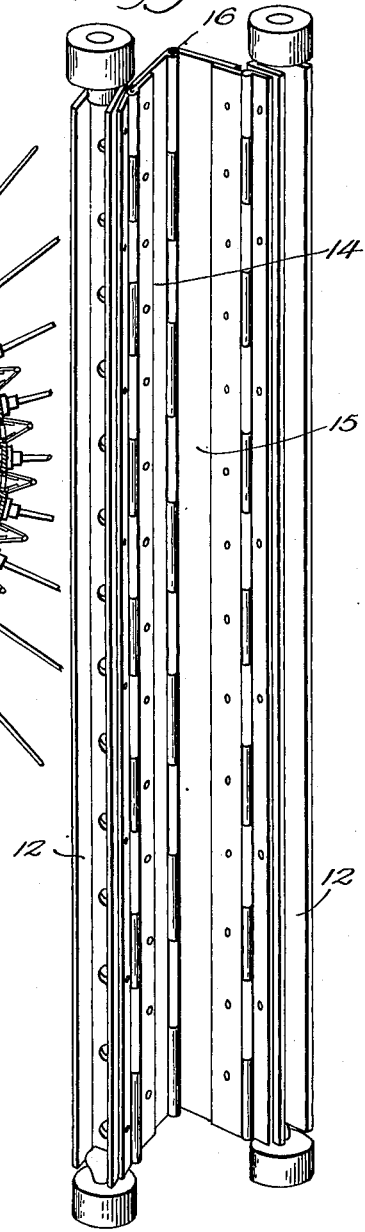
INVENTOR.
HIRAM N. BERRY,
BY
ATTORNEY.

Patented Feb. 18, 1930

1,747,567

UNITED STATES PATENT OFFICE

HIRAM N. BERRY, OF GREENVILLE, MISSISSIPPI, ASSIGNOR, BY DIRECT AND MESNE ASSIGNMENTS, TO COTTON HARVESTER CORPORATION OF AMERICA, OF WILMINGTON, DELAWARE, A CORPORATION OF DELAWARE

COTTON PICKER

Original application filed April 23, 1927, Serial No. 186,148. Divided and this application filed February 9, 1928. Serial No. 253,041.

My present invention relates to that type of cotton picker employing rotating spindles radiating from revolving drums or cylinders and having stripper bars in series around the cylinders, which bars are shiftable inwardly and outwardly along the spindles, and is more particularly a division of my copending application, Serial Number 186,148 describing and claiming means by which the stripper bars are so connected as to present substantially an unbroken wall in order to avoid any danger of cotton finding its way around the stripper bars and packing upon those portions of the spindles inwardly beyond the bars.

My present application is limited to that form of construction outlined in my above application wherein the connections between the bars are in the nature of jointed plates adapted to flex at and between the bars to avoid any interference with their movements for the purpose set forth.

In the accompanying drawing, which illustrates my present invention and forms a part of this specification, Figure 1 is a partial horizontal section through a cylinder showing the application of my improved connecting plates between the stripper bars, and, Figure 2 is a detail perspective view, on an enlarged scale, of a pair of stripper bars and their connecting plates.

Referring now to Figure 1, I have shown at 10, a picking cylinder used in practice substantially as shown in my copending application 8,134 filed January 14, 1926. The picking of cotton is accomplished by a plurality of picking spindles 11, radiating from the cylinder 10, and rotating upon their own axes during revolution with the cylinder. The cotton wraps around the spindles at one side of the cylinder and as it revolves the tufts of cotton are gradually pushed outwardly along the spindles by means of stripper bars 12, one for each vertical row of spindles. These stripper bars revolve with the cylinder and in such movement are guided inwardly and outwardly by stationary guides 13, eccentric with respect to the cylinder so that at a point approximately diametrically opposite to the first mentioned side of the cylinder the tufts of cotton are pushed to the extreme ends of the spindles and may be easily and effectively removed by a simple doffing mechanism, such for instance as that shown, in my application 8,134 above mentioned.

Since it is possible cotton might find its way around the stripper bars and become packed upon the spindles inwardly beyond the bars, I propose to connect the latter by means of hinged plates 14, and 15, arranged in pairs between successive bars throughout the series. The plates of each pair are hingedly connected to one another at their inner adjacent edges and are similarly connected at their outer edges to the stripper bars. It is thus possible to make the plates of counter-part construction and to employ hinge pins or pintles 16, capable of ready, easy removal in order to promote quick access to the cylinder in case adjustment, repair or substitution of parts becomes necessary. The flexing of these plates on their hinges avoids any interference with the desired operation and functions of the stripper bars and still permits the plates to form with the stripper bars a substantially unbroken wall around the cylinder, effectively preventing the passage of cotton inwardly beyond the stripper bars.

Having thus fully described my invention, what I claim is,

1. In a cotton picker including a picking cylinder, peripherally outstanding picking spindles and stripper bars revolving with the cylinder and operating lengthwise of the spindles, means consisting of hinged plates connected to the stripper bars and forming therewith a substantially unbroken wall for protective purposes around the cylinder.

2. In a cotton picker, including a picking cylinder, peripherally outstanding picking spindles, and stripper bars revolving with the cylinder and operating lengthwise of the spindles, means consisting of hinged plates connected to the stripper bars and forming therewith a protective wall around the cylinder, said plates having quick detachable connections permitting ready access to the cylinder.

3. A cotton picker including a picking cylinder, radially outstanding picking spindles carried by and revolving with the cylinder, stripper bars revolving with the cylinder and operating along the spindles, and plates arranged in pairs between the several bars, the plates of each pair being hingedly connected to one another along their inner edges and similarly connected at their outer edges to the stripper bars.

4. A cotton picker including a picking cylinder, radially outstanding picking spindles carried by and revolving with the cylinder, stripper bars revolving with the cylinder and operating along the spindles, and plates flexibly connected to one another and to said bars, and forming with the latter a substantially unbroken wall around the cylinder for the purpose set forth.

In testimony whereof I affix my signature.

HIRAM N. BERRY.